(No Model.)

R. W. NEWTON.
AUTOMATIC SPRINKLER.

No. 514,161. Patented Feb. 6, 1894.

WITNESSES:
Henry J. Miller
M. F. Bligh

INVENTOR:
Robert W. Newton,
by Joseph A. Miller & Geo.
Attys.

UNITED STATES PATENT OFFICE.

ROBERT W. NEWTON, OF PROVIDENCE, RHODE ISLAND.

AUTOMATIC SPRINKLER.

SPECIFICATION forming part of Letters Patent No. 514,161, dated February 6, 1894.

Application filed March 7, 1893. Serial No. 464,977. (No model.)

*To all whom it may concern:*

Be it known that I, ROBERT W. NEWTON, of the city of Providence, in the county of Providence and State of Rhode Island, have invented certain new and useful Improvements in Automatic Sprinklers; and I hereby declare that the following is a full, clear, and exact description of the same, reference being had to the accompanying drawings, forming part of this specification.

This invention has reference to improvements in automatic-sprinklers in which valves, normally held in place to close the supply-pipes, are released by a sufficient rise in temperature.

The object of the invention is to construct an improved automatic-sprinkler in which the valve is held in place against all possible pressure and which will open instantly when the solder-joints become weakened by a sufficient rise in temperature.

The invention consists in certain novel features of construction and combination of parts as will hereinafter be more fully described and pointed out in the claim.

Figure 1:
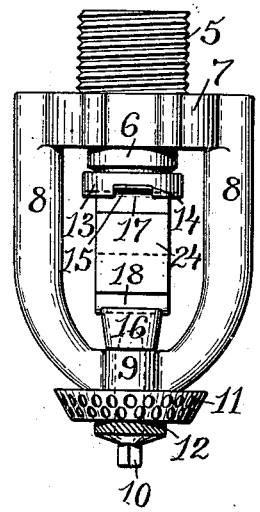
Figure 2:
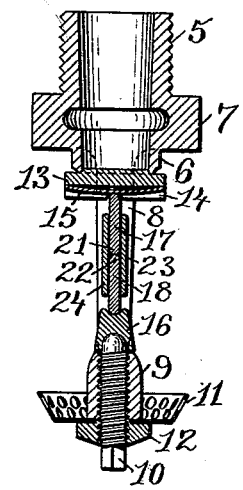
Figure 3:
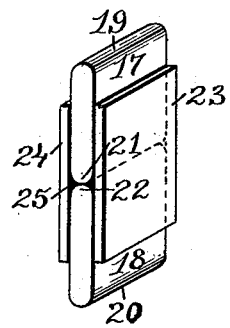

Figure 1 represents a view of an automatic-sprinkler showing one form of the improved valve-support. Fig. 2 represents a vertical sectional view of the same. Fig. 3 represents an enlarged view of the thrust-support.

Similar numbers of reference designate corresponding parts throughout.

In automatic-sprinklers, valves or seals are held against openings in water-supply pipes by levers, blocks, or struts, which are retained in position by solder which is fusible at a comparatively low temperature, this solder forming parts of the supporting-device, as links, or being used to secure two or more neighboring surfaces together; the tensile strength or compressional resistance of this solder being extremely small the levers, struts, &c., are so constructed and arranged as to reduce the strain on the same to a minimum, the breaking of these solder-joints causing large damage from the escaping water, the tendency has, therefore, been to use very small quantities of the solder and to so locate it that the leverage exerted upon it under normal conditions will be slight.

In carrying my invention into practice my desire has been to entirely dispense with the solder as a thrust-resisting medium and to provide a valve-supporting or seal-holding device formed of separable parts the strain-resisting members of which will bear against each other in intimate contact.

In the drawings 5 indicates the tubular threaded-shank of an automatic-sprinkler, and 6 is a valve-seat at the lower end of the shank. Formed in part with the shank 5, or secured thereto, is the yoke 7 the arms 8—8 of which terminate in the hub 9, through a vertical screw-threaded perforation in which, the thrust-screw 10 extends, and beneath the hub 9 the deflector 11 is secured on the screw 10 by the thumb-nut 12, the end of the screw being faceted to be readily engaged by a key or wrench, and the upper end of the screw being conical. The valve-seat is closed by a valve-disk 13 which has a transverse-groove 14 in its lower surface in which the vent-spring 15 is contained. The lower surface of the valve-disk has also a transverse groove which extends at right angles with the groove 14 in which the upper edge of the valve-support is seated.

Supported on the upper end of the thumb-screw 10 is the pillow-block 16 having a grooved upper surface and a self-centering cavity in its lower surface. Interposed between the pillow-block 16 and the valve-disk 13 is a valve-support consisting of the plates, or struts, 17 and 18 the rounded edges 19 and 20 of which are seated respectively in the grooves of the valve-disk and of the pillow-block. In securing these plates together the adjoining edges 21 and 22 of the plates are rounded and are brought into intimate contact with each other in perfect alignment, the side-plates 23 and 24 are then secured to the sides of the thrust-plates 17 and 18 by fusible-solder 25 which may fill up the spaces left by the rounding edges 21 and 22, but is not interposed between these plates. After the valve-support has been placed between the pillow-block and valve-disk the thrust-screw is adjusted to increase the pressure on the same and to exert a strain on the spring 15, and in the normal condition the pressure of the water on the valve-seat is resisted by practically a solid strut. When, however, the solder securing the side-plates 23 and 24 becomes slightly fused, the adjoining rounded edges 21 and 22 of the plates 17 and 18 will act as a hinge on which these plates will turn until becoming separated the members will drop entirely out of the sprinkler-frame and the water will pass unobstructed to the deflector 11 from which it is distributed. In actual practice I find that this valve-support is extremely sensitive to the action of heat, but when in its normal condition it will withstand an enormous pressure exerted in the central plane of the plates.

Having thus described my invention, I claim as new and desire to secure by Letters Patent—

The combination with a sprinkler having the valve-seat 6, the yoke 7, the arms 8—8 extending from the yoke and meeting in the perforated-hub 9, the thrust-screw 10 secured in the hub and carrying a deflector, of the valve-disk 13, a spring contained within a groove in the lower surface thereof, the pillow-block 16 supported on the thrust-screw, and a valve-support consisting of the thrust-plates 17 and 18 the edges 21 and 22 of which are held in intimate contact, and the side plates 23 and 24 secured to the thrust-plates by solder.

In witness whereof I have hereunto set my hand.

ROBERT W. NEWTON.

Witnesses:
   HENRY J. MILLER,
   JOSEPH A. MILLER, Jr.